(12) United States Patent
Snyder

(10) Patent No.: US 6,296,211 B1
(45) Date of Patent: *Oct. 2, 2001

(54) DUCT AND PIPE BRACKET FOR USE BETWEEN JOISTS

(75) Inventor: Darryl L. Snyder, Canton, OH (US)

(73) Assignee: Snyder National Corporation, Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,387

(22) Filed: Nov. 23, 1999

Related U.S. Application Data

(63) Continuation-in-part of application No. 08/730,129, filed on Oct. 15, 1996, now abandoned.

(51) Int. Cl.[7] .................................................. F16B 15/00
(52) U.S. Cl. ............................ 248/71; 248/62; 248/217.2; 248/546; 248/68.1; 248/74.1
(58) Field of Search .................................. 248/57, 65, 58, 248/59, 70, 71, 217.2, 217.3, 218.1, 218.2, 218.3, 87, 88; 52/39, 27, 407.3

(56) References Cited

U.S. PATENT DOCUMENTS

| | | | |
|---|---|---|---|
| 2,917,263 | * 12/1959 | Appleton et al. | 248/217.3 |
| 3,163,386 | * 12/1964 | Collins | 248/71 |
| 3,285,553 | * 11/1966 | Hexdall | 248/71 |
| 3,718,307 | * 2/1973 | Albanese | 248/57 |
| 4,518,141 | * 5/1985 | Parking | 248/546 |
| 4,538,786 | * 9/1985 | Manning | 248/544 |
| 4,909,405 | * 3/1990 | Kerr, Jr. | 220/3.9 |
| 5,024,403 | * 6/1991 | Carlston | 248/57 |
| 5,593,115 | * 1/1997 | Lewis | 248/68.1 |
| 5,678,799 | * 10/1997 | Jorgensen et al. | 248/343 |
| 5,845,886 | * 12/1998 | McCormick | 248/200.1 |
| 5,938,157 | * 8/1999 | Reiker | 248/200.1 |
| 6,086,029 | * 7/2000 | Oliver | 248/200.1 |
| 6,105,918 | * 8/2000 | Gromotka | 248/343 |
| 6,123,154 | * 9/2000 | MacDonald, III et al. | 169/37 |

* cited by examiner

Primary Examiner—Leslie A. Braun
Assistant Examiner—Naschica S. Morrison
(74) Attorney, Agent, or Firm—Sand & Sebolt

(57) ABSTRACT

A mounting bracket for supporting hollow ducts or water lines, or both in combination, between spaced-apart juxtaposed joists in a building structure comprising a lengthy plastic support member having a lineal length less than the joist spacing and a pair of parallel hollow open channels extending throughout its length, a pair of rod-shaped metallic members mounted adjacently and telescopically within said open channels, said metallic members having right-angled projecting end portions for rotational movement and forcible penetration of said bracket into juxtaposed joists to support said hollow ducts or water lines in durable long-term permanent relation within a building structure.

12 Claims, 5 Drawing Sheets

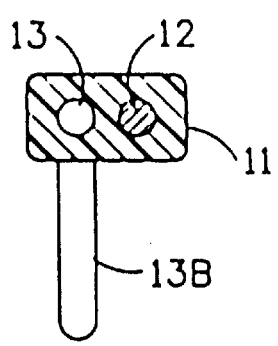
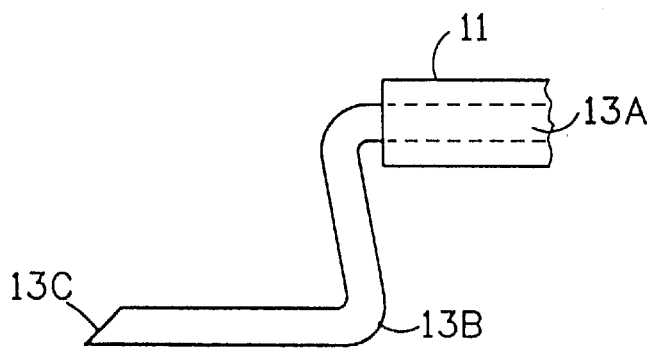
AA
FIG. 4
FIG. 5
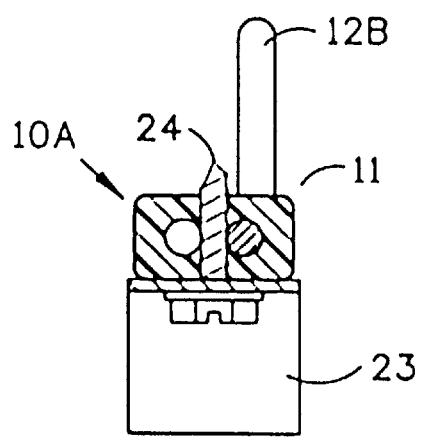
BB
FIG. 7

DUCT AND PIPE BRACKET FOR USE BETWEEN JOISTS

CROSS REFERENCE TO RELATED APPLICATION

This application is a continuation-in-part application of application Ser. No. 08/730,129 filed Oct. 15, 1996, now abandoned, the disclosures of which are incorporated herein by reference.

BACKGROUND OF THE INVENTION

1. Technical Field

The present invention relates to an improved bracket or hanger for dual use for supporting fluid-carrying ducts between adjacent joists in a building structure as well as water lines.

2. Background Information

As is well known in heating, cooling, ventilating and air-conditioning systems (HVAC systems) in residential homes, condominiums, apartments, office buildings and other building structures, the duct members are usually comprised of metallic pipes, hollow composite materials such as tubes, and the like supported from and between floor or ceiling joists. It is common practice for the HVAC system to include an elongated primary or main duct from which extends a series of smaller branch or fluid-distributing ducts which are mounted between adjoining floor or ceiling joists and are parallel thereto. Such main and branch duct members which are located between joists are normally supported by metal wires or adjustable metal hangers which are placed between the joists in transverse supporting relation and are attached thereto by various means.

In addition, the ducts may be supported by such hangers or brackets and water supply and waste water lines may also be so supported. This invention pertains to a more universal improved bracket for dual use for supporting air ducts and water lines.

Normally the adjustable metal hangers have a substantial depth of section which is not readily amenable to expeditious cutting to length to fit between non-uniform adjoining joists. Also non-uniformity of the spacing between adjacent joists creates an installation problem. The sometimes variable distances between adjacent joists prevent the utilization of duct hangers having standard uniform lengths. In addition, the pointed ends or tapered prongs on the ends of certain types of adjustable hangers are not easily or satisfactorily driven into wooden joists at desired locations or at prescribed spacing due to imperfections in the wooden joists such as knots, holes, cracks and the like. The prongs sometimes break off during installation rendering the bracket useless for the intended purpose. The pointed ends or prongs are occasionally only partially or incompletely seated in the joists and lose their load-carrying ability at one end or the other in time, allowing the duct or pipe to sag, loosen or break. Also the metallic hangers create a heat transfer loss from the ducts to the hangers, and in addition cause a noise and vibration problem due to air flow in the ducts and resonance noise in the floors, ceilings and surrounding areas. The vibration and resonance contributes to the unseating of the hanger ends. The prior art hangers are only horizontally adjustable and cannot be vertically adjustable for their mounting between the joists.

U.S. Pat. No. 3,163,386 discloses an adjustable duct hanger having tapered prongs at its ends which are not easily or satisfactorily driven into the joists for the aforesaid reasons. Also the two telescopic sections are more expensive to manufacture and assemble. U.S. Pat. No. 5,024,403 discloses a pipe hanger having an upper rectangular plate of prescribed length which is difficult to sever, and ends which cannot penetrate the joists easily or satisfactorily. There are other adjustable hangers in the prior art such as disclosed in U.S. Pat. No. 3,285,553 which experience mounting problems due to their wedge-shaped prongs. And, as stated, all impart vibration and noise to the floor and ceiling joists due to operational mechanical components such as motors and fans associated with the HVAC ducts because of their all-metal construction and interconnection. As stated, known hangers can only be adjusted horizontally to fit between adjacent joists. None can be adjusted vertically in full supporting relation beneath the ducts or water lines.

SUMMARY OF THE INVENTION

Accordingly, it is a primary objective of this invention to provide an improved bracket for multiple use having an essentially uniform length of lineal plastic material less than the normal spacing between adjoining floor joists with a pair of parallel narrow open channels therewithin which contains a pair of rod-shaped metallic members in spaced-apart slidable relation. The two rod-shaped metallic members of the bracket extend through the major portion of the plastic body member with angled projecting ends extending to close proximity to the juxtaposed joists in order to force with impact their shaped ends into the wooden joists.

Another objective of this invention is to provide an improved bracket for universal use which can be economically manufactured and assembled from plastic material and metallic rods for more versatile use between both uniform and non-uniform joist spacing. The bracket utilizes a uniform lineal length of plastic material to retain a parallel pair of rod-shaped metallic rods in slidable relation, the rods having right-angled projecting ends for positive load-bearing restraint of the ducts or water lines of varying sizes. The present bracket offers an important feature of vertical adjustment at its ends so that the bracket can be mounted in precise supporting relation with respect to the ducts and fluid lines.

A further objective of this invention is to provide a simplified and economical telescoping bracket for dual use which requires no severance for length adjustment and can be readily mounted in precise vertical and horizontal relationship to the ducts and water lines between adjacent joists having uniform or variable spacing. The plastic body member contacts the ducts or waterlines to dampen or eliminate vibration, and resonance and noise imparted to the joists by action of fluid flow occurring in the ducts or mechanical components of the system.

A still further objective of this invention is to provide a dual bracket which is economical to manufacture and efficient to use having characteristics of heavy and permanent load-carrying ability within the space between adjacent floor and ceiling joists and is especially capable of substantial noise reduction and lesser heat transfer in HVAC systems.

With the aforesaid and additional objectives in mind, the invention comprises an improved bracket for load-supporting capability and unique to components thereof, which are inexpensive to manufacture and are readily usable in an expedient manner.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

In the accompanying drawings, the same reference numerals indicate the same parts and elements of the bracket in all views.

FIG. 4 is an enlarged fragmentary vertical sectional view of the bracket taken along the line 4—4 of FIG. 2;

FIG. 5 is an enlarged side elevational view of one end portion of the bracket showing one projecting pointed end;

FIG. 7 is an enlarged fragmentary vertical sectional view of the bracket taken along the line B—B of FIG. 6;

DESCRIPTION OF THE PREFERRED EMBODIMENTS

Figure 1:
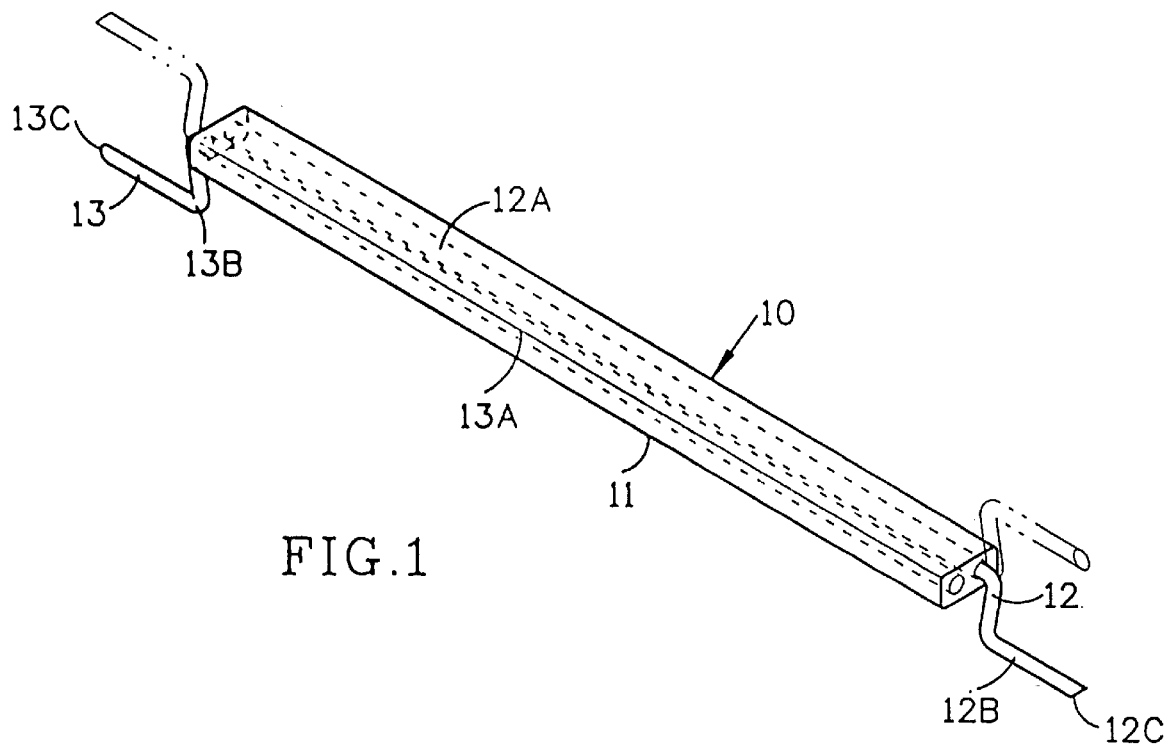
FIG. 1 is a perspective view of the subject improved bracket for dual use showing the various basic components thereof.
Figure 2:
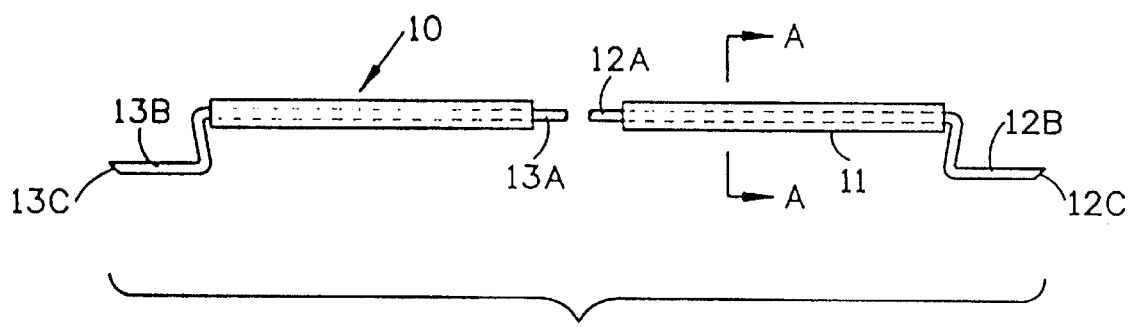
FIG. 2 is a side elevational view of the bracket shown in FIG. 1 severed at its center portion.

As stated supra, in most common types of heating, cooling and ventilating systems which are installed in residential homes, condominiums, apartments and commercial buildings, an elongated main fluid-carrying duct extends from the fluid source, such as a furnace or air-conditioning unit, to a series of branch ducts which normally extend throughout the building structure. The various main and branch ducts are usually located between and parallel to the floor and ceiling joists. The various ducts must be adequately and securely supported in such hollow areas to maintain integrity of the system and to conserve space, especially the headspace for the floors below.

The prior art hangers or brackets, as aforesaid, particularly those having wedge-shaped prongs at their ends, are difficult to forcibly drive into the joists and can experience breakage of one or both prongs. The pronged ends frequently do not retain the load at both ends of the bracket over time, and occasionally require nails to be driven from the bracket into the joists for proper duct support. Also the several layers of metal and substantial depth of section of many known types of brackets cannot be conveniently cut to size at the job-site in order to fit within narrowly-spaced joists.

The present invention provides an improved universal bracket 10 which comprises a generally rectangularly-shaped main body member 11 having a uniform cross-section and a length ranging from about 10 to 12 inches. The optimum preferred length is determined by the normal spacing between adjacent spaced-apart joists in many building structures which is typically 14 inches. The main body member 11 is preferably comprised of relatively rigid durable plastic material such as polypropylene or other comparable plastic material. The body member has preferred dimensions in cross section of about ¼ inch by ½ inch and a pair of hollow open parallel channels extending throughout its length. The similar open channels have uniform open diameters of about ⅛ inch. Obviously, the dimensions of the plastic body member and its inner open channels may be varied widely as desired. The body member 11 has square cut ends and a lineal dimension less than ordinary joist spacing.

A pair of rod-shaped telescoped members 12 and 13 are fitted within the open adjacent channels having straight portions 12a and 13a which extend throughout the major length of the body member. The rod-shaped members 12 and 13 are preferably comprised of about ⅛ inch diameter steel rod or slightly less diameter for their freely slidable mounting within the open channels of the body member. The rods add considerable strength to the body member and are freely telescoped therein. The rods 12a and 13a are similarly shaped in circular cross section and have right-angle-shaped projecting free ends which are pointed at their ends. The right-angled end portions are designated as 12b and 13b on the drawings and their pointed terminating end portions as 12c and 13c. The rod members 12 and 13 may be freely rotated within the channels through a full 360 degrees of rotation for ready mounting of the bracket in any desired orientation. The straight rod portions of the rod members 12 and 13 may be slid both inwardly and outwardly for ready adjustable installation of the bracket. The fully rotatable character of the metallic rods in the body member permit a wide range of vertical adjustment of bracket mounting. The projecting pointed ends of the rod members are adapted to penetration of the wooden joists by forcibly pounding or impacting of the right-angled end portions of the rod members with a hammer or other device.

Figure 3:
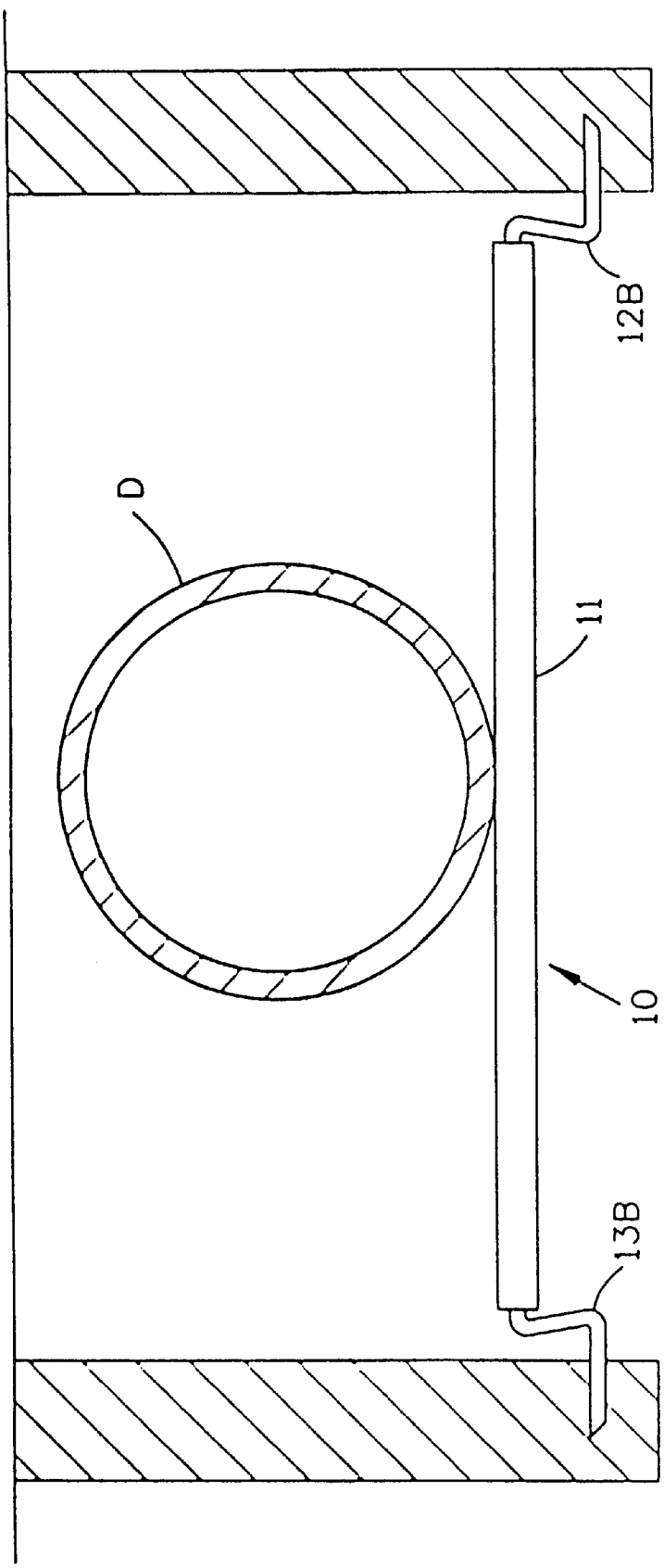
FIG. 3 is a side elevational view of the bracket with its main body portion in raised position supporting an air duct and its projecting angular ends in a lower position supported by floor joists shown in section.

FIG. 3 shows the bracket with its main body member in its upper position supporting the hollow air duct. The projecting ends of the rod members are turned downwardly with their pointed terminating portions driven into the joists in their uppermost position.

Figure 6:
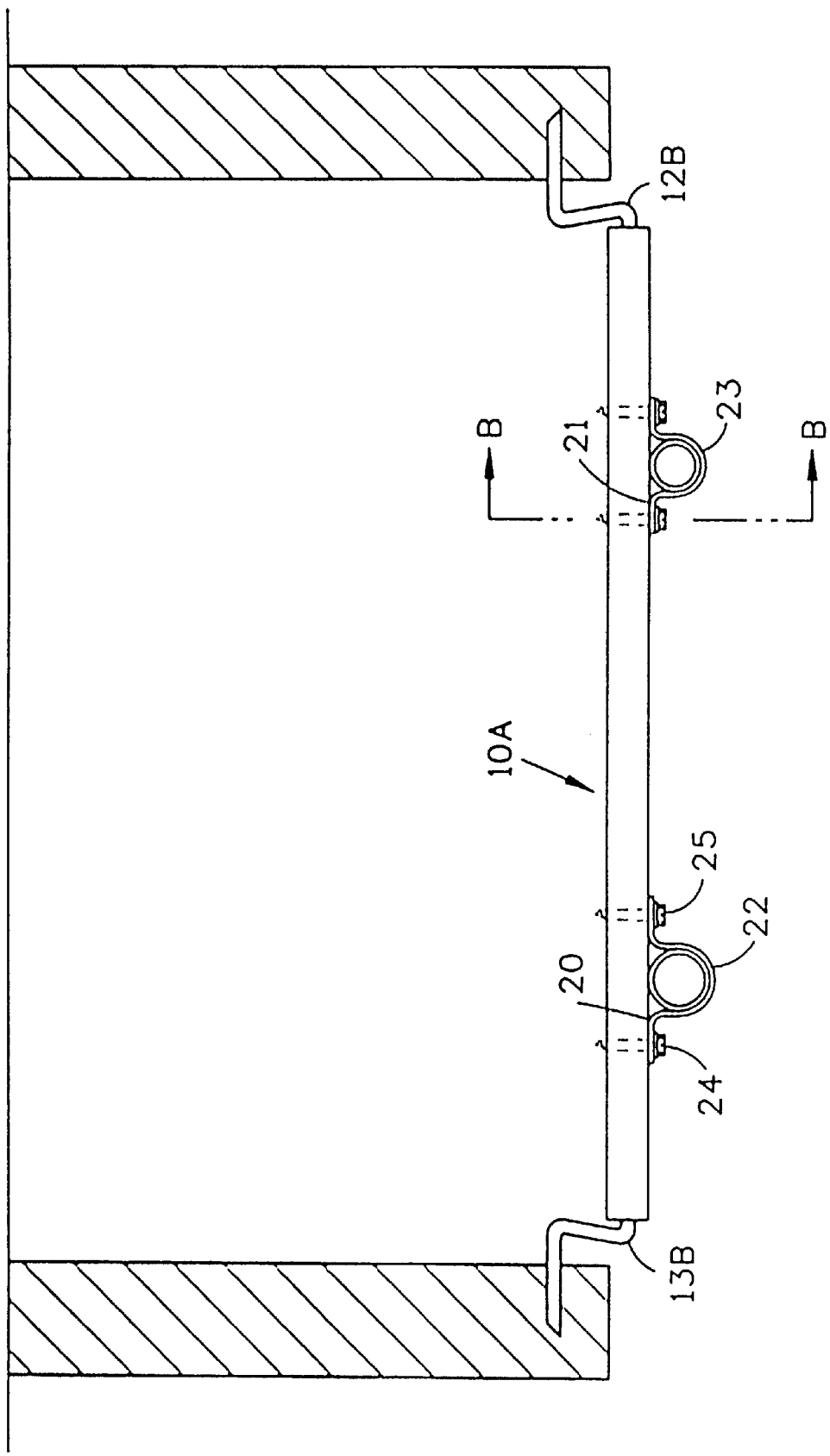
FIG. 6 is a side elevational view of the bracket similar to FIG. 3 with the main body portion in lower position with a pair of U-shaped clamps affixed to its lower side for retaining a pair of water pipes.
Figure 8:
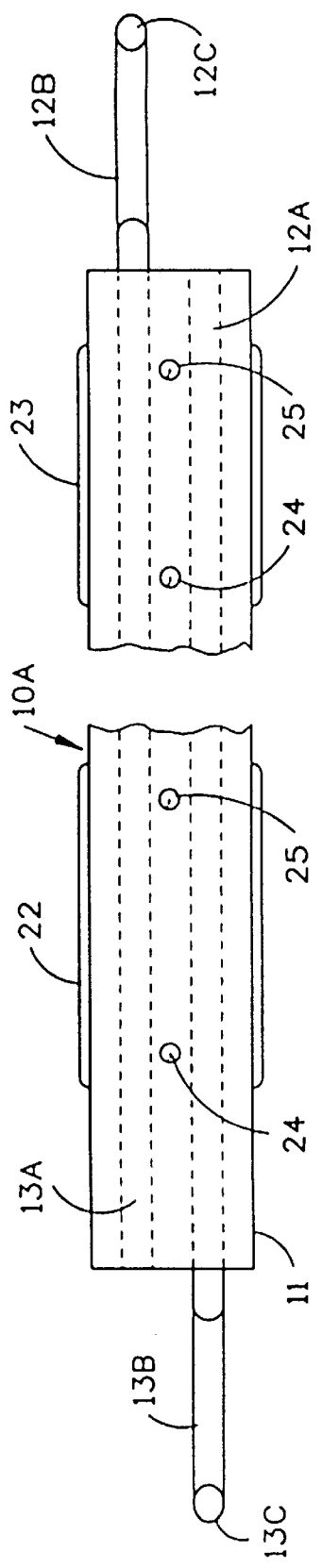
FIG. 8 is a further enlarged top plan view of the bracket shown in FIGS. 6 and 7 severed in a medial region.
Figure 9:
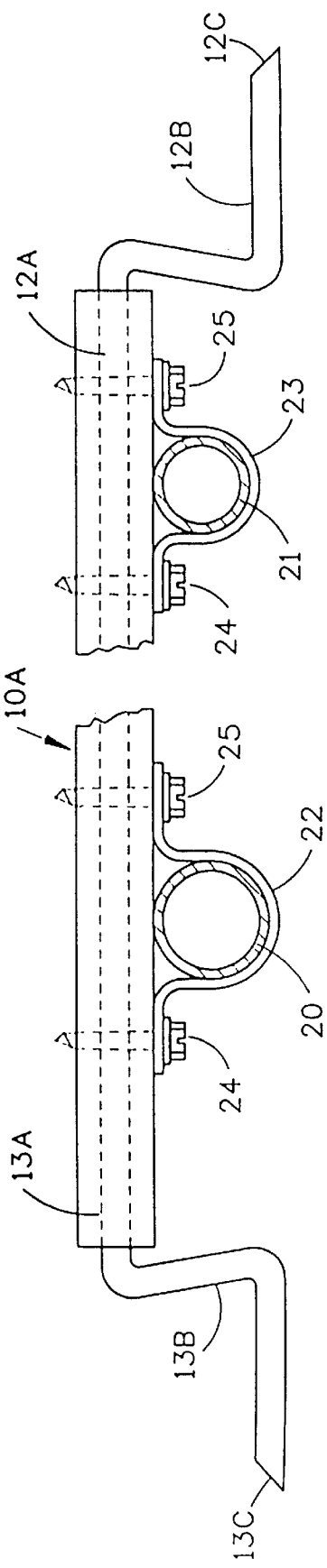
FIG. 9 is a side elevational view of the bracket shown in FIG. 8 showing the pair of U-shaped clamps affixed to the bracket in spaced-apart relation.

FIG. 6 shows another embodiment of the bracket 10a with its main body member in its lower position with the projecting ends 12b and 13b in their upper positions for duct or water line support. The projecting ends of the rods may also be mounted in the joists in the same plane as the main body portion as desired or in other alternative orientation. In addition, one projecting end can be turned upwardly and the other downwardly as desired for installation of the bracket 10 or 10a. The right-angled projecting ends 12b and 13b of the rod members are suitable for their forceful pounding into the wooden joists.

The bracket does not require the cutting of its main body member which is sized to fit between normal joist spacing with some relatively loose freedom of movement. The largely enclosed rod members 12 and 13 being journaled telescopically in the main body member 11 permit their movement both laterally and rotationally for quick and ready mounting of the bracket 10 or 10a in both horizontally and vertically positive alignment with the ducts, or water lines and joists.

With the plastic main body member comprised preferably of polypropylene or high-density polyethylene, for example, having some flexibility and resiliency, the bracket 10 or 10a is mounted under the ducts or water lines and between the joists without any direct metal-to-metal contact or interconnection. The plastic body member absorbs essentially any and all vibration and resonance which occurs in the ducts and water lines due to forceful air flow and water flow as well as mechanical vibration of moving components of the system such as motors, fans and pumps. It has been observed that a marked dampening or complete elimination of noise and vibration from the fluid-carrying system, whether it consists of air or water flow, is obtained which is a very significant feature and benefit of the subject bracket. When the main and branch ducts or water lines of the system are all supported by a plurality of the subject brackets, a measurable reduction of tones of noise is obtained, especially over the long-term working life of the system. FIGS. 3 shows the bracket 10 properly-installed between adjoining joists with the duct D resting on and supported by its upper surface of the bracket. FIG. 6 shows the bracket 10a in the modified embodiment with a pair of water lines 20 and 21 supported in a pair of U-shaped clamps 22 and 23 attached to the underside of the bracket 10a.

The subject brackets 10 and 10a when properly installed can readily handle heavy weights as indicated by testing of the brackets with concrete blocks suspended between a pair of the brackets installed between joists. The brackets when so loaded will tend to bow downwardly, but strengthen due to a wedging action of the angled projecting ends of the bracket, whether the projecting seated ends are placed above or below the plastic main body member on both sides thereof, or in the same plane as main body 11, the brackets show the same strengthening-effect.

In the foregoing description, certain terms have been used for brevity, clearness and understanding; but no unnecessary limitations are to be implied therefrom beyond the requirement of the prior art, because such terms are used for descriptive purposes and are intended to be broadly construed FIGS. 6 and 7 show the pair of U-shaped clamps 22 and 23 attached to the main body member 11 of the bracket by a pair of metal screws threaded into the body member in self-seating arrangement. The screws 24 and 25 are attached within a medial region of the bracket centered so that the screws pass between the rod members 12 and 13 seated in the main body member. The screws 24 and 25 are usually attached in such area after the bracket is mounted between joists with the rod members in their normally seated positions. The screws also serve to lock the rod members in fixed position so that their projecting ends cannot separate from the joists. The water pipes 26 and 27 may be the same or dissimilar diameter for water delivery or for waste water lines.

Thus, the brackets 10 or 10a can be used serially attached to plural floor or ceiling joists or other building members over long runs to support both ducts and/or water lines as desired. The brackets can be used for ducts only or for water lines thereof, or for other members to be supported.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Various modifications may be resorted to within the spirit and scope of the appended claims.

What is claimed is:

1. An improved mounting bracket adapted to support a duct between and in longitudinal alignment with a pair of spaced-apart joists, the mounting bracket adapted to be carried by the joists to provide a transverse support element beneath a duct; the mounting bracket comprising:

an elongated support member defining first and second channels;

the first channel being substantially parallel with the second channel;

first and second rods;

the first rod being slidably and rotatably received in the first channel;

the second rod being slidably and rotatably received in the second channel;

the first and second channels each having an inner diameter; the first and second rods each having an outer diameter slightly less than each inner diameter of the first and second channels;

each rod having an offset projecting portion; the projecting portions of the rods being disposed on opposite ends of the support member;

each of the projecting portions including a terminating end extending away from the support member; and each of the terminating ends being sharply pointed and adapted for forcible penetration into the joists to support the bracket with respect to the joists.

2. The bracket of claim 1, wherein the support member has a length adapted to be less than the space between the joists.

3. The bracket of claim 1, wherein the support member has a substantially rectangular cross-sectional shape.

4. The bracket of claim 1, wherein the support member is fabricated from a durable polypropylene plastic material.

5. The bracket of claim 1, wherein the first and second channels have a substantially circular cross section.

6. The bracket of claim 5, wherein the first and second channels have substantially equal diameters.

7. The bracket of claim 1, wherein each of the first and second rods is fabricated from metal.

8. The bracket of claim 1, wherein the support member is about 10 inches in length.

9. The bracket of claim 1, wherein each of the first and second rods has a diameter of about ⅛ inch.

10. The bracket of claim 1, wherein the support member is generally rectangular in shape and has cross section dimensions of about ¼ inch by ½ inch.

11. An improved mounting bracket adapted to support a duct between and in longitudinal alignment with a pair of spaced-apart joists, the mounting bracket adapted to be carried by the joists to provide a transverse support element beneath a duct; the mounting bracket comprising:

an elongated support member;

first and second rods;

the first rod being slidably and rotatably carried by the support member;

the second rod being slidably and rotatably carried by the support member;

the first rod being substantially parallel and spaced from the second rod;

each rod having a right-angled projecting portion; the projecting portions of the rods being disposed on opposite ends of the support member;

each of the projecting portions including a terminating end extending away from the support member; and wherein the first and second rods may be rotated with respect to the support member to change the position of the right-angled projecting portions with respect to the support member.

12. The bracket of claim 11, wherein each of the terminating ends is sharply pointed and adapted for forcible penetration into the joists to support the bracket with respect to the joists.

* * * * *